July 3, 1951      J. J. PICHETTE      2,559,461
BOBBIN SPINDLE CONSTRUCTION
Filed April 10, 1950
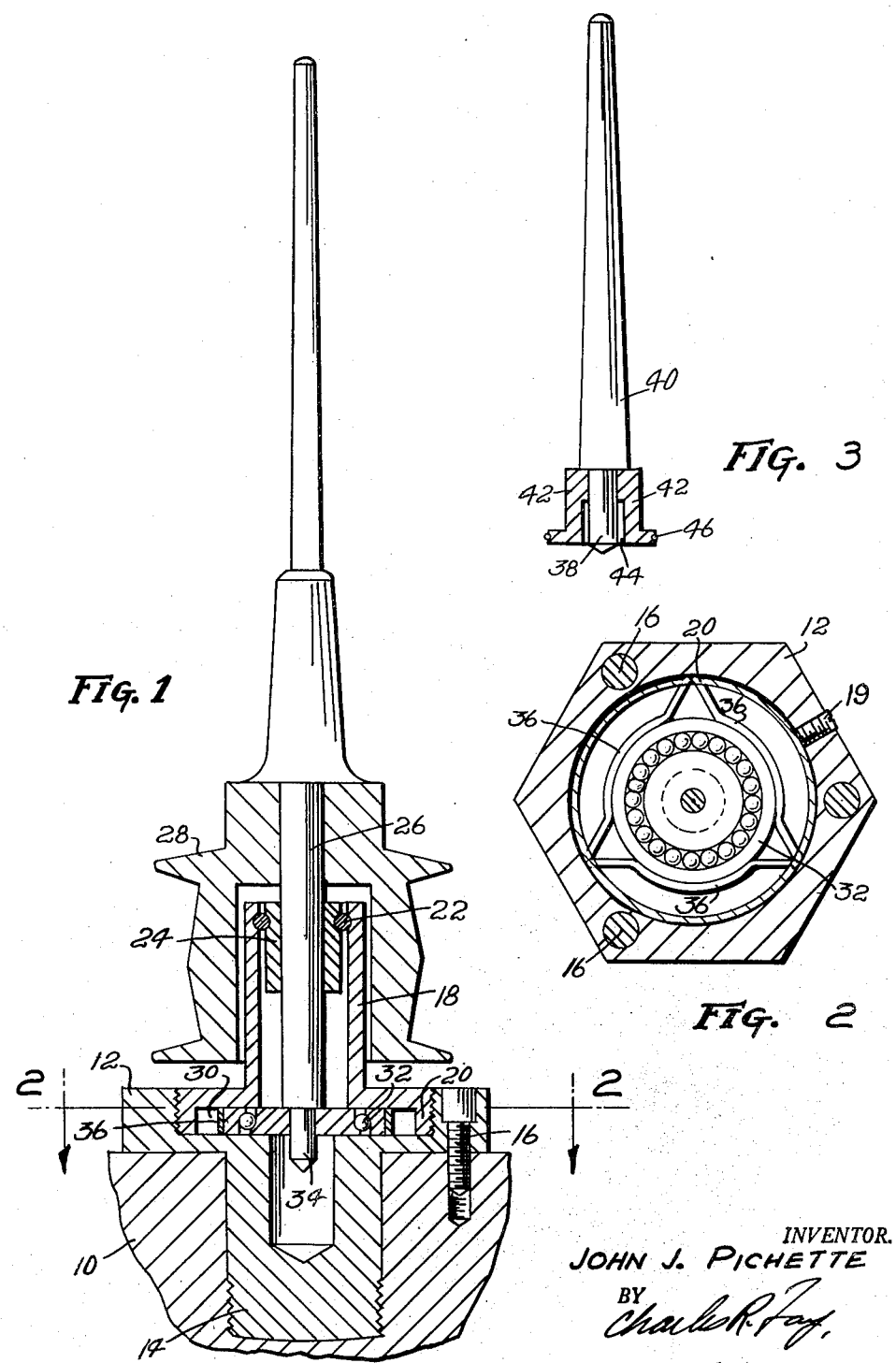
INVENTOR.
JOHN J. PICHETTE
BY
Charles R. Fay,
ATTORNEY Patented July 3, 1951

2,559,461

UNITED STATES PATENT OFFICE 2,559,461

BOBBIN SPINDLE CONSTRUCTION

John J. Pichette, Whitinsville, Mass.

Application April 10, 1950, Serial No. 155,089

5 Claims. (Cl. 242—130)

This invention relates to bobbin spindle constructions and the principal object of the invention resides in the provision of a device of the class described embodying an improved positive bobbin holding and supporting bearing construction including means allowing the bobbin spindle to pivot slightly under transverse or radial pressure about a certain defined axis, the bearing construction being such as to positively and firmly journal the spindle regardless of such pivot action.

Another object of the invention resides in the provision of a bobbin spindle support including a frame adjustably supported on the rail of the spinning or winding machine that the spindle is used on, said frame embodying means for the reception of a slidable thrust bearing preferably of the ball race type and supporting the lower end of the bobbin spindle for controlled radial movement thereof, in combination with a second bearing embodying a spindle pivot means, said second bearing being mounted on the aforesaid frame in spaced relation to the above mentioned sliding bearing above the same so as to provide a pivot axis for transverse or radial pivotal motion of the spindle.

Other objects and advantages of the invention will appear hereinafter.

Reference is to be had to the accompanying drawings in which

Fig. 1 is a vertical cross sectional view through the spindle support;

Fig. 2 is a section on line 2—2 of Fig. 1; and

Fig. 3 shows a modified bearing construction.

The rail of the machine is indicated at 10 and a frame 12 is secured by screw threading or otherwise to the rail, as by a threaded plug or stud 14. The frame 12 may be hexagonal and provided with a plurality of set screws 16 for leveling the frame 12 and its supported structures to be later described on the rail. Set screws 16 may, of course, merely contact the top surface of rail 10 or they may be threaded thereinto as shown in Fig. 1.

A sleeve 18 is provided with a screw threaded flange 20 threading into the interior of the frame 12 which is hollowed out for this purpose. A set screw 19 may be used to secure the flange to the frame. The sleeve 18 extends upwardly and is provided adjacent its upper end with an interior washer of metal or rubber as indicated at 22. This washer holds the bearing 24 to rotatably support the spindle 26 within the whirl 28. Bearing 24 is preferably an Oilite type bearing.

The flange 20 and frame 12 together provide a circular chamber in the frame 12 for the reception of a bearing 32. The inner race of the bearing holds the end 34 of spindle 26, the outer race being yieldably held by a series of springs 36, see Fig. 2, in a central position as will be clearly apparent. The springs 36 bear at their ends against the flange 20 and are provided with central depressions to fit the outer bearing race. The entire bearing 32, both inner and outer races, is slidable between the flat surfaces of the frame 12 and member 18 so that if the spindle 26 is laterally pressed, it can pivot about the ring 22 to a slight degree, but the springs 36 will always return the same to the central position shown and will yieldingly resist such lateral thrusts allowing the same to occur without damage to the spindle.

A modification of the device appears in Fig. 3 wherein the lower end 38 of spindle 40 is provided with spring members 42 spaced therefrom as at 44 and provided with ball bearings 46, the latter bearing against an immovable cylindrical element such as for instance sleeve 18. In this case, springs 42 will allow slight movement of the spindle under more or less the same conditions as those described above.

Having thus described my invention and the advantages thereof, I do not wish to be limited to the details herein disclosed otherwise than as set forth in the claims, but what I claim is:

1. Bobbin spindle mounting comprising a frame, a sleeve thereon, a flange on the sleeve cooperating with the frame to form a chamber, a spindle bearing in the chamber, a spindle in the bearing, a second bearing in the sleeve receiving the spindle in spaced relation to the first named bearing, the latter being radially movable in the chamber, and means supporting and swiveling the second bearing in the sleeve.

2. Bobbin spindle mounting comprising a frame, a sleeve thereon, a flange on the sleeve cooperating with the frame to form a chamber, a spindle bearing in the chamber, a spindle in the bearing, a second bearing in the sleeve and receiving the spindle above the first named bearing, the latter being radially movable in the chamber, and a ring between the second bearing and the sleeve to provide a transverse pivot axis for the spindle.

3. Bobbin spindle mounting comprising a frame, a sleeve, a flange on the sleeve secured to the frame with the sleeve in spaced relation to the frame forming a chamber between the frame and sleeve, a bearing in the chamber, a spindle in the bearing, the latter being slidable in the chamber radially of the spindle, a bearing in the sleeve journaling the spindle above the chamber, and means connecting the sleeve and sleeve bearing for pivotal movement of the latter in the former.

4. Bobbin spindle mounting comprising a frame, a sleeve, a flange on the sleeve secured to the frame with the sleeve in spaced relation to the frame forming a chamber between the frame and sleeve, a bearing in the chamber, a spindle in the bearing, the latter being slidable in the chamber radially of the spindle, a bearing in the sleeve journaling the spindle above the chamber, means connecting the sleeve and sleeve bearing for pivotal movement of the latter in the former, and supporting the sleeve bearing in the sleeve, and means yieldably centering the bearing in the chamber relative to the spindle axis.

5. Bobbin spindle mounting comprising a frame, a sleeve, a flange on the sleeve secured to the frame with the sleeve in spaced relation to the frame forming a chamber between the frame and sleeve, a bearing in the chamber, a spindle in the bearing, the latter being slidable in the chamber radially of the spindle, a bearing in the sleeve journaling the spindle above the chamber, means connecting the sleeve and sleeve bearing for pivotal movement of the latter in the former, and means yieldably centering the bearing in the chamber relative to the spindle axis, said bearing centering means comprising a plurality of strip springs bearing at their ends on the flange and at their central portions on the bearings at spaced areas at the circumference thereof.

JOHN J. PICHETTE.

REFERENCES CITED

The following references are of record in the file of this patent:

UNITED STATES PATENTS

| Number | Name | Date |
|---|---|---|
| 1,539,972 | Todd | June 2, 1925 |
| 1,884,805 | Moritz | Oct. 25, 1932 |
| 2,417,525 | Smith | Mar. 18, 1947 |
| 2,464,024 | Carter et al. | Mar. 8, 1949 |